US011954356B2

(12) United States Patent
Zhuo et al.

(10) Patent No.: US 11,954,356 B2
(45) Date of Patent: Apr. 9, 2024

(54) APPARATUS, METHOD, AND SYSTEM FOR COLLECTING COLD PAGES

(71) Applicant: Intel Corporation, Santa Clara, CA (US)

(72) Inventors: Qiuxu Zhuo, Shanghai (CN); Anthony Luck, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 17/433,714

(22) PCT Filed: Mar. 29, 2019

(86) PCT No.: PCT/CN2019/080362
§ 371 (c)(1),
(2) Date: Aug. 25, 2021

(87) PCT Pub. No.: WO2020/198913
PCT Pub. Date: Oct. 8, 2020

(65) Prior Publication Data
US 2022/0137860 A1    May 5, 2022

(51) Int. Cl.
*G06F 3/06* (2006.01)
*G06F 12/0817* (2016.01)
*G06F 12/0868* (2016.01)

(52) U.S. Cl.
CPC .......... *G06F 3/0655* (2013.01); *G06F 3/0604* (2013.01); *G06F 3/0644* (2013.01);
(Continued)

(58) Field of Classification Search
CPC ............ G06F 12/0817; G06F 12/0868; G06F 2212/466
See application file for complete search history.

(56) References Cited

U.S. PATENT DOCUMENTS

| | | | |
|---|---|---|---|
| 2003/0191903 A1* | 10/2003 | Sperber | G06F 12/0875 711/E12.063 |
| 2011/0271070 A1 | 11/2011 | Worthington et al. | |
| 2012/0047313 A1 | 2/2012 | Sinha et al. | |
| 2015/0095577 A1* | 4/2015 | Vijayrao | G06F 12/0842 711/129 |

(Continued)

FOREIGN PATENT DOCUMENTS

| | | |
|---|---|---|
| CN | 106970881 A | 7/2017 |
| CN | 108733313 A | 11/2018 |
| CN | 108763104 A | 11/2018 |

OTHER PUBLICATIONS

International Search Report and Written Opinion, PCT App. No. PCT/CN2019/080362, dated Jan. 8, 2020, 9 pages.

(Continued)

*Primary Examiner* — David Yi
*Assistant Examiner* — Nicholas A. Paperno
(74) *Attorney, Agent, or Firm* — NICHOLSON DE VOS WEBSTER & ELLIOTT LLP

(57) ABSTRACT

Apparatus, method, and system for efficiently identifying and tracking cold memory pages are disclosed. The apparatus in one embodiment includes one or more processor cores to access memory pages stored in the memory by issuing access requests to the memory and a page index bitmap to track accesses made by the one or more processor cores to the memory pages. The tracked accesses are usable to identify infrequently-accessed memory pages, where the infrequently-accessed memory pages are removed from the memory and stored in a secondary storage.

21 Claims, 17 Drawing Sheets

(52) U.S. Cl.
CPC ........ *G06F 3/0679* (2013.01); *G06F 12/0817* (2013.01); *G06F 12/0868* (2013.01)

(56) References Cited

U.S. PATENT DOCUMENTS

| | | | | |
|---|---|---|---|---|
| 2016/0140040 A1* | 5/2016 | Mukherjee | .......... | G06F 12/1027 711/135 |
| 2016/0378655 A1* | 12/2016 | Blagodurov | ........ | G06F 12/0811 711/122 |
| 2017/0139768 A1* | 5/2017 | Camp | .................. | G06F 3/0647 |
| 2018/0107404 A1* | 4/2018 | Cox | ...................... | G06F 3/0608 |
| 2019/0294345 A1* | 9/2019 | Yu | ....................... | G06F 12/0638 |
| 2019/0324857 A1* | 10/2019 | Xu | ...................... | G06F 11/1438 |

OTHER PUBLICATIONS

Supplementary European Search Report and Search Opinion, EP App. No. 19922898.2, dated Sep. 26, 2022, 10 pages.

Wang, Xiaoyuan, "Supporting Superpages and Lightweight Page Migration in Hybrid Memory Systems", arXiv: 1806.00776v1, Jun. 3, 2018, 12 pages.

International Preliminary Report on Patentability, PCT App. No. PCT/CN2019/080362, dated Oct. 14, 2021, 6 pages.

Gregg, Brendan, "Working Set Size Estimation", Available Online at <http://www.brendangregg.com/wss.html>, Jan. 17, 2018, 10 pages.

kernel.org, "Idle Page Tracking—The Linux Kernel Documentation", Available Online at <https://www.kernel.org/doc/html/latest/admin-guide/mm/idle_page_tracking.html>, Dec. 19, 2018, 3 pages.

Levandoski, et al., "Identifying Hot and Cold Data in Main-Memory Databases", 2013 IEEE 29th International Conference on Data Engineering (ICDE), Available Online at <http://citeseerx.ist.psu.edu/viewdoc/download?doi=10.1.1.461.1336&rep=rep1&type=pdf>, 2013, 12 pages.

wikipedia.org, "Expotential Backoff", Available Online at <https://en.wikipedia.org/wiki/Exponential_backoff>, Oct. 29, 2018, 2 pages.

Intention to Grant, EP App. No. 19922898.2, Dec. 9, 2023, 8 pages.

* cited by examiner

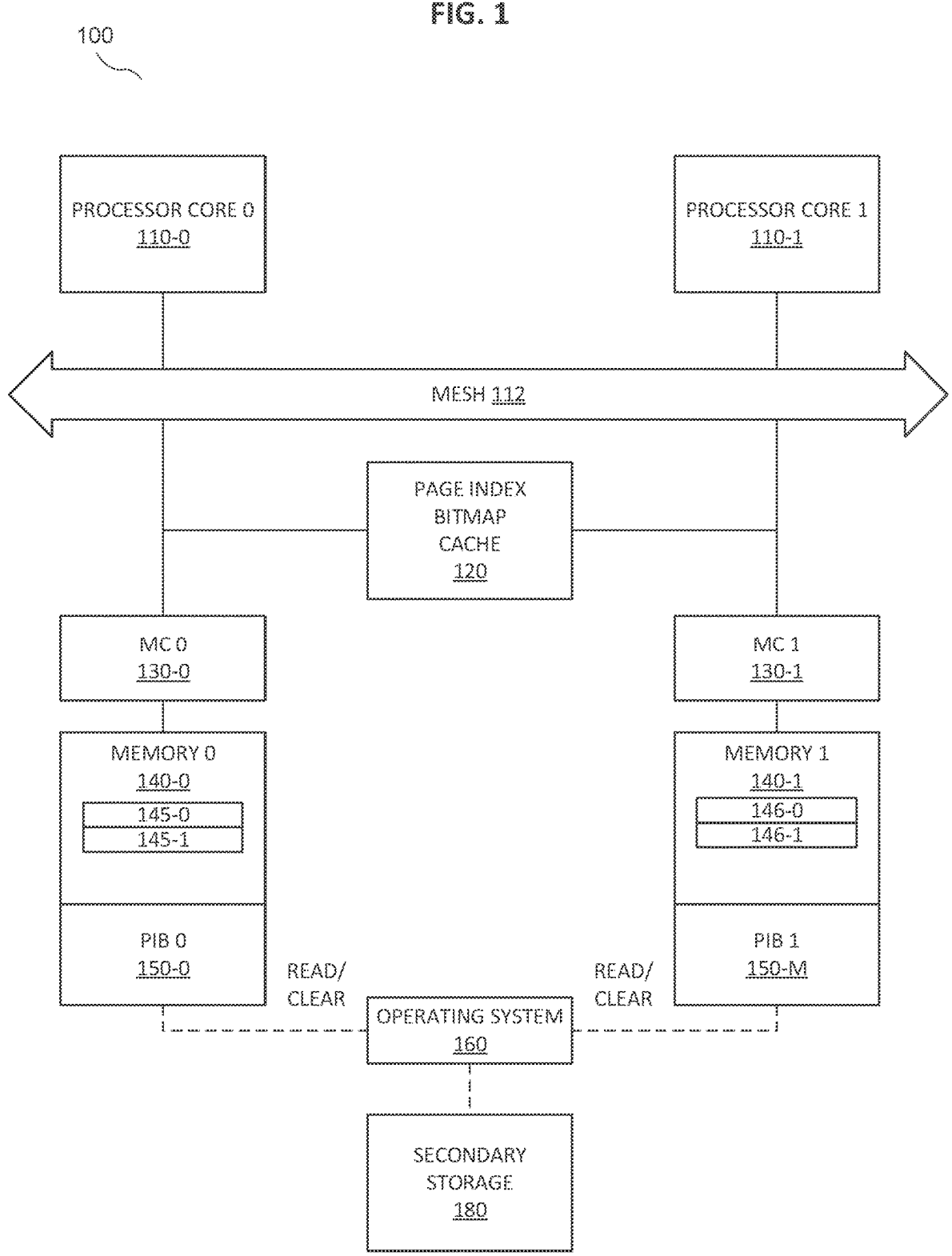

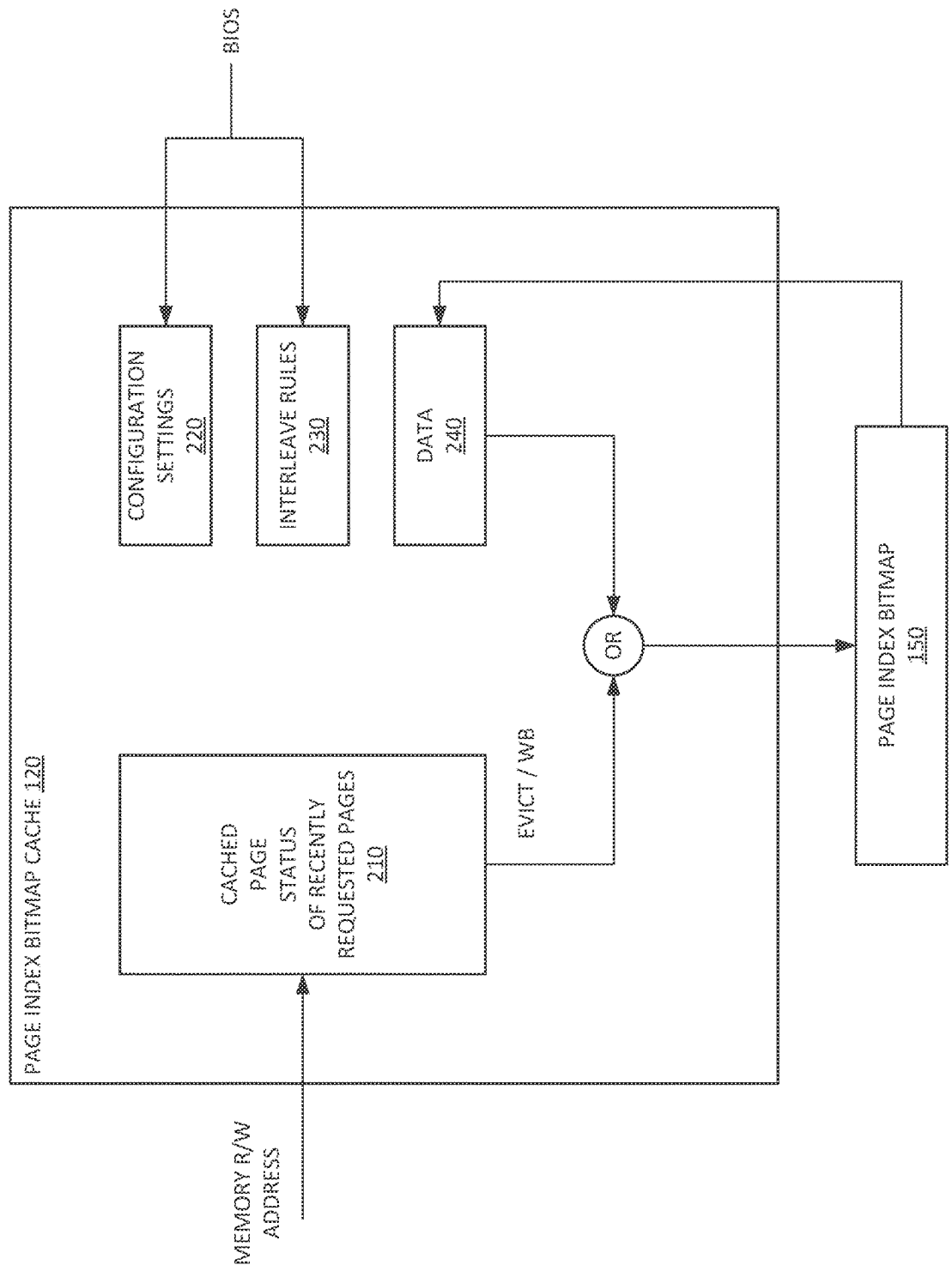

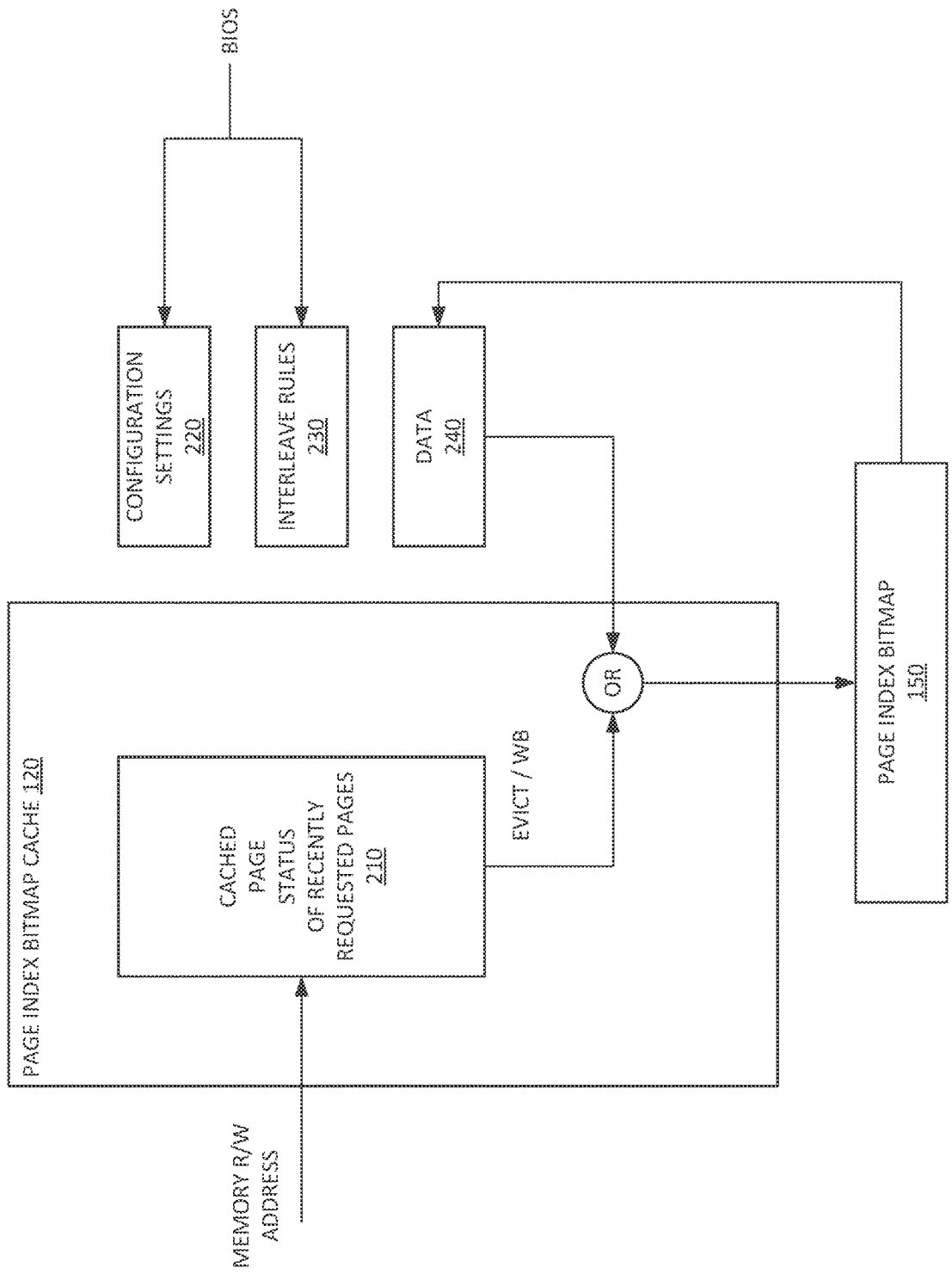

| | CACHE SIZE (MB) | ADDRESS SPACE COVERED BY THE CACHE (MB) |
|---|---|---|
| LLC | 1 | 1 |
| TLB | 1 | 512 |
| PAGE INDEX BITMAP CACHE | 1 | 32,768 |

FIG. 4

| CACHE TYPE | OPERATION 1 | OPERATION 2 | OPERATION 3 | MEMORY ACCESS |
|---|---|---|---|---|
| NORMAL CACHE | EVICT A DIRTY CL | FILL THE CL | UPDATE THE CL | 2 |
| BITMAP CACHE | FIND UNALLOCATED CL | SET BIT OF CL | — | 0 |

FIG. 7

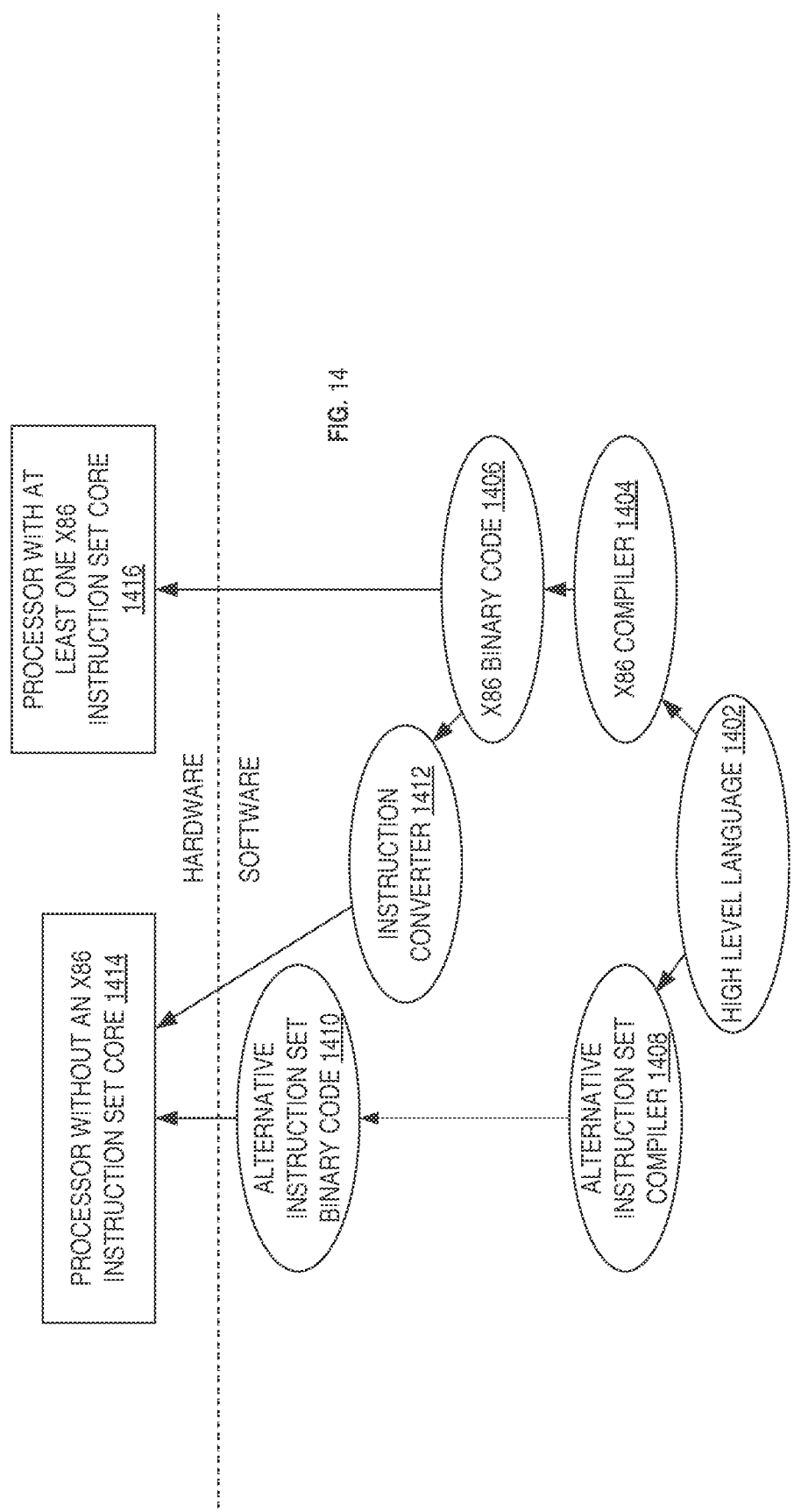

APPARATUS, METHOD, AND SYSTEM FOR COLLECTING COLD PAGES

TECHNICAL FIELD

Embodiments of the invention described herein relate generally to the efficient utilization of memory in a computer processing system. In particular, the disclosure relates to computer architectural extensions for identifying and tracking cold memory pages.

BACKGROUND ART

Cold memory pages, or cold pages for short, refer to memory pages that are infrequently accessed and/or not being actively used. Keeping cold pages in memory takes up valuable memory space. With the per capacity cost of secondary storage options, such as mechanical hard disk and solid state drives, being much lower than system memory (e.g. DDR4), it is often more economical to store cold pages in secondary storage rather than in system memory. To efficiently identify and track cold pages, however, has been a challenge. Conventional solutions that use existing paging structures, such as a page table, to track cold pages tend to be very inefficient both in terms of storage space and processing time. For example, a typical 8-byte page table entry (PTE) of a page table tracks only a single 4 kilobyte (KB) memory page. In modern systems where gigabytes or even terabytes of memory are often being used, this approach results in an enormous number of PTEs that has to be processed in order to identify all of the tracked cold pages. In doing so, most, if not all, of the performance benefits gained through moving the identified cold pages from memory are negated by the large consumption of computing resources. A better solution is thus needed to address this issue.

BRIEF DESCRIPTION OF THE DRAWINGS

The invention may best be understood by referring to the following description and accompanying drawings that are used to illustrate embodiments of the invention. In the drawings:

FIG. 1 illustrate a system embodiment on which various aspects of the present invention may be implemented;

FIGS. 2A-2B are block diagrams to illustrate the details of different embodiments of a page index bitmap cache;

FIG. 4 is a table comparing the address space size covered by various storage structures and an embodiment of the page index bitmap cache;

FIG. 7 is a table comparing the memory accesses during a write miss, between a normal cache and an embodiment of the page index bitmap cache;

FIG. 14 illustrates a block diagram contrasting the use of a software instruction converter to convert binary instructions in a source instruction set to binary instructions in a target instruction set according to embodiments of the invention.

DETAILED DESCRIPTION

Figure 3A:
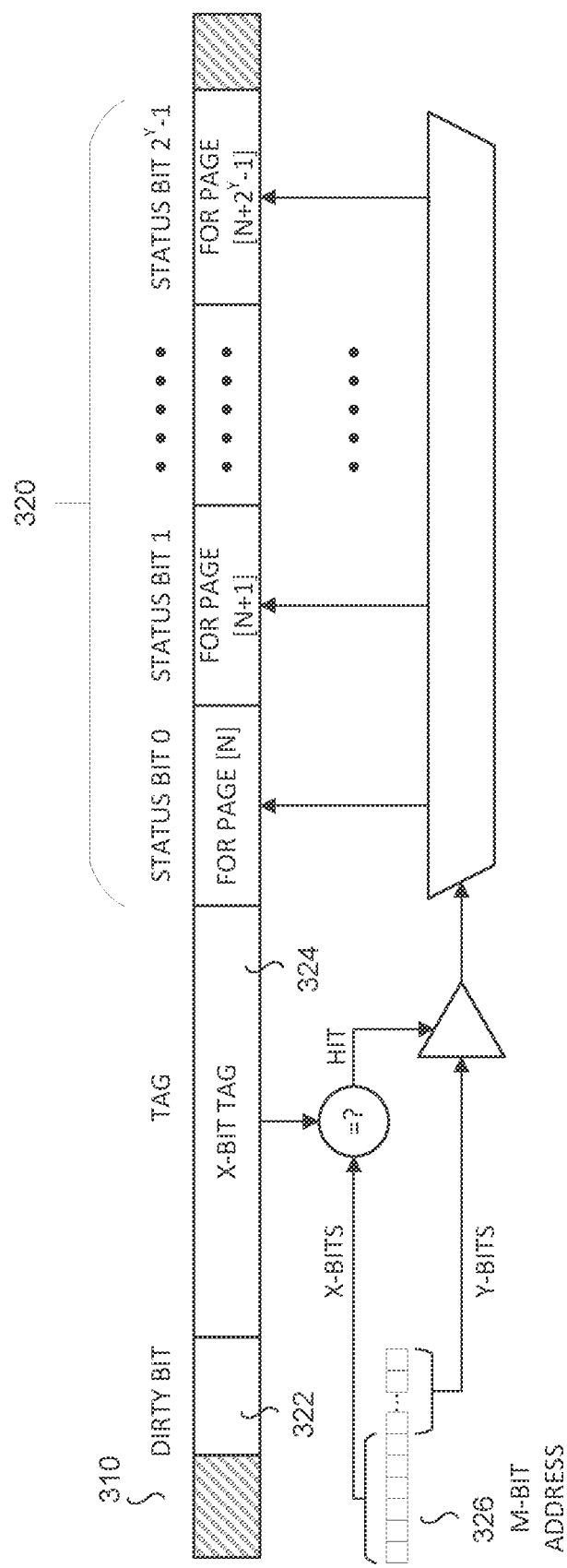
FIGS. 3A-3B are block diagrams to illustrate entries of the page index bitmap cache in accordance to some embodiments.

Embodiments of apparatus, method, and system for efficiently identifying and tracking cold memory pages are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

An aspect of the disclosure is directed to a page index bitmap cache to efficiently store the page status (cold or non-cold) of recently accessed memory pages. The page index bitmap cache monitors the connections (e.g., a mesh interconnect) for access requests made by various components (e.g., processors or cores) of a socket to the pages stored in memory. In at least some embodiments, the page index bitmap cache is characterized by a large ratio between the cache size and the size of the address space it covers. This characteristic differentiates the page index bitmap cache from conventional solutions, such as those using page table entries (PTEs) to track page status. For example, according to an embodiment, a page index bitmap cache includes multiple 8-byte cache line entries, each capable of tracking the status of 64 pages. Assuming 4 kilobytes (KB) page size, each page index bitmap cache entry is thus capable of covering 256 KB of address space. Compare this with conventional solutions, where each 8-byte PTE provides the status of just one 4 KB page, the page index bitmap cache covers 64 times more address space and is thus 64 times more space efficient. The less data the processor cores need to process to gain the same page status information also means less computing resources are required.

Another aspect of the present invention is directed to an optimized write miss policy that schedules memory writes/reads to evict and to fill page index bitmap cache entries only when it is necessary and/or when there is minimum impact on memory bandwidth. This, in turn, minimizes disruptions and/or added latencies to normal memory read and write accesses made by other components in the system. When the cached data in the bitmap cache is flushed into a reserved page index bitmap in the memory, consumers such as operating systems and applications, can quickly read and make use of the cold pages indices. Moreover, users, such as cloud vendors, may also use the cold page information to do DDR4/secondary storage capacity planning and scalability analysis for cloud workloads, such as making decision to store cold pages on secondary storage rather than in memory.

FIG. 1 illustrates a system embodiment on which various aspects of the present invention may be implemented. In at least some embodiments, system 100 is a socket that includes one or more processor cores 110 and one or more memory modules 140 that make up the system memory. Each of the memory modules 140 may be controlled by a corresponding memory controller 330. Memory pages 145, 146 stored in the memory modules 140 may be accessed by the processor cores 110 through read or write requests. Moreover, at least some of the memory modules 140 may include a reserved space for storing a page index bitmap 150. In one embodiment, the page index bitmap 150 is distributed among the one or more memory modules 140. The page index bitmap 150 may store the page status of all of the pages in memory. Alternatively, the page index bitmap 150 may store the page status of only a subset of the pages in memory. The page status of a page may be used to determine whether or not a page is cold. According to an embodiment, the page index bitmap 150 includes an array of bits. Each of the bits in the array corresponds to a different page and stores the status of that page. The page index bitmap 150 may be accessed by the operating system (OS) 160 and/or applications running on the OS (not shown) to identify cold memory pages. The OS 160 and/or the applications may identify cold pages by scanning or searching the page index bitmap 150 for pages that have unset status bits. The OS 160 and/or applications may proactively move the identified cold pages from the memory modules 140 to a secondary storage 180 (e.g., hard disk drive (HDD) or a solid state drive (SSD)) that are more economical and less performance-critical than the system memory. This, in turn, frees up the system memory to store more frequently accessed pages. The various elements in system 100 may communicate with one another through a mesh interconnect 112. While the page index bitmap 150 is shown to be stored in the memory modules 140, it will be appreciated that in some embodiments, the page index bitmap 150 may be implemented as a standalone storage component separate from the system memory.

According to an embodiment, the page index bitmap 150 can be reserved for a space in memory via basic input/output system (BIOS) during system boot up, if the user enables the page index bitmap option in the BIOS setup menu. In one embodiment, the size (in bits) of the reserved memory equals to the (total memory size in the socket in bytes) divide by the (size of the page in bytes). For example, with a page size of 4 KB which is commonly used by modern OSs, the size of the reserve memory would be 8 K bits for a 32 MB memory.

In one embodiment, the bit offset in the bitmap is used as the page index for identifying the page and the bit value is used to indicate the page status. For example, a bit value of "0" may indicate that the corresponding page is cold while a bit value of "1" indicates the opposite.

In at least some embodiments, system 100 further includes a page index bitmap cache 120. The page index bitmap cache may be a low-overhead cache that observes and/or detects memory read/write requests made by the processor cores 110 to the memory controllers 130 (or locations in the memory modules 140). The page index bitmap cache may periodically flush the collected pages status into the reserved page index bitmap 150.

FIG. 2A is a block diagram illustrating the details of the page index bitmap cache in accordance to an embodiment. Page index bitmap cache 120 may be managed by cache controller (not shown). Page index bitmap cache 120 may include various storage for storing the page status of recently requested pages 210, cache configuration settings 220, memory interleave rules 230, and data received from the page index bitmap 150. The storage for page status of recently requested pages 210 may include multiple entries, each entry storing the page status of multiple pages. Each of the entries may comprise one or more cache lines.

The cache configuration settings 220 control the operations of the page index bitmap cache. In some embodiments, the configuration settings may be set by the user, operating system, and/or applications, and are configured through the BIOS of the computer system. Example of the configurable settings include the size of the memory page, the size of the system memory, the base memory address of the reserved page index bitmap in memory, etc.

As described above in reference to FIG. 1, the reserved page index bitmap may be distributed among multiple memory modules depending on the configuration. The interleave rules 230 are used by the page index bitmap cache, or the corresponding cache controller, for determining the appropriate target memory controllers and/or channels to which data from an evicted cache entry are sent in a write back situation.

The data 240 refers to data retrieved from the reserved page index bitmap 150. The data 240 may be stored in a data register. According to some embodiments, the page index bitmap cache 120 is relatively small in size and have limited cache entries to capture and/or track the page status of recently requested memory pages (i.e. memory page requested within a certain time frame). To avoid overfilling and/or overwriting any of the cached page status, the page index bitmap cache must periodically flush the cached page status to the bigger reserved page index bitmap 150. This may also be achieved through the eviction mechanism. According to an embodiment, to flush or evict cached page status, the page index bitmap cache retrieves existing bitmaps from the reserve page index bitmap and performs a logical OR to merge the cached page status with the stored page status. Doing so preserves the page status that are already captured by the page index bitmap.

While the storage for configuration settings 220, interleave rules 230, and existing bitmap data 240 are shown to be integrated as part of the page index bitmap cache 120, it will be appreciated that any and all of these elements may be stored outside the page index bitmap cache 120, such as in registers. FIG. 2B is a block diagram illustrating alternate embodiment of the page index bitmap cache 120 in which the aforementioned elements are stored outside of the page index bitmap cache 120.

As described above, the page index bitmap cache may include multiple entries. Each of the entries may occupy one or more cache lines. FIG. 3A is a block diagram illustrating an entry in accordance to embodiments of the page index bitmap cache. According to the embodiment, each entry 310 of the page index bitmap cache includes one or more status bits 320, a dirty bit 322, and a multi-bit tag 324. Each of the one or more status bits 320 corresponds to a different memory page and stores the status (i.e. cold/not-cold) of that page. In some embodiments, the page status bit tracks whether or not the page has been requested within a given time frame. For example, when the bitmap cache or its controller detects a request to access a page in memory (e.g., a request to read or write to a page), the status bit corresponding to the requested memory page is set in the page index bitmap cache. Thus, a set status bit serves as an indication that the page corresponding to the status bit is not cold because it has been accessed within the given time frame.

The dirty bit 322 of an entry is used to indicate whether any of the status bits in that entry have been modified. According to an embodiment, the dirty bit of an entry is cleared each time the entry is initialized and/or allocated. The dirty bit of an entry may also be cleared when the data in the entry has been evicted or saved to the page index bitmap in the memory during reclamation of the entry. Each time any of the status bits of an entry is set to track an observed memory request, the dirty bit of that entry is set as well.

The tag 324 is used to index the entries in the page index bitmap cache. According to an embodiment, each page in memory is associated with an M-bit memory address 326. A portion of the memory address comprising X number of bits (X-bits) is used as the tag. When an entry is allocated in the page index bitmap cache to track a detected memory page request, X-bits of the requested memory address is stored as the tag 324 of the allocated entry. Moreover, a different portion of the requested memory address, comprising Y number of bits (Y-bits) is used as an offset to determine which of the $2^Y$ status bits in the entry will be used to track the status of the accessed page. Once the appropriate status bit is determined, that status bit is set to indicate that the corresponding page was accessed. As noted above, when the status bit is set in an entry, the dirty bit of the entry is set as well.

Figure 3B:
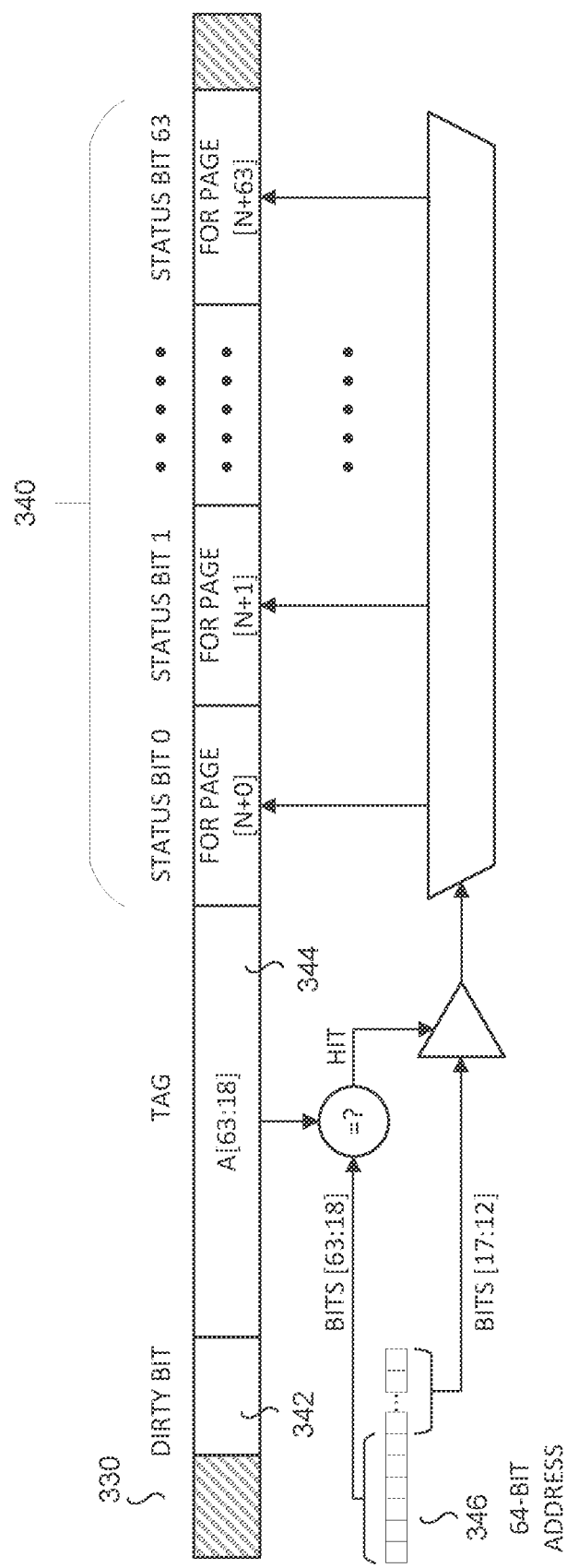

FIG. 3B shows an exemplary entry of the page index bitmap cache according to an embodiment. According to the embodiment, each memory page is associated with a 64-bit memory address. When a memory request is detected, the requested memory address 346 is used to determine and set the appropriate status bit in the page index bitmap cache. For instance, bits {63:18} of the memory address is used to match with the tag 344 of the entries in the bitmap cache. When a matching entry 330 is found, bits {17:12} of the requested memory address is then used to determine the status bits in the matching entry that corresponds to the requested page. For example, if bits {17:12} of the requested address are all zeroes, then status bit 0 in the matching entry is set. On the other hand, if bits {17:12} are all ones, then status bit 63 is set. In this particular embodiment, the ratio between the cache size and the address space size covered by the bitmap cache is 1:32768. This means that an 1 KB bitmap cache is capable of covering a 32 MB address space (1 KB*8 bit/B*4 K/bit). This large ratio allows a large number of the pages to be tracked with only a relatively small bitmap cache. The large ratio also means that the page index bitmap cache has a less impact on the usage of memory bandwidth because it evicts entries to memory less frequently.

FIG. 4 is a table comparing the address space size covered by various storage structures, including a last level cache (LLC), a Translation Lookaside Buffer (TLB), and a specific embodiment of the page index bitmap cache described above. Specifically, in the case of the LLC, each 1 MB of cache space covers 1 MB of address space. In the case of a typical TLB, each 1 MB of cache space covers 512 MB of address space. In contrast, each 1 MB of the page index bitmap cache covers 32,768 MB of address space.

In at least some embodiments, the page index bitmap cache's write policy is similar or identical to that of a normal cache (e.g. LLC). In other words, the page index bitmap cache uses the write back policy when a matching entry is found in the cache (i.e. write hit) and uses the write allocation policy when no matching entry if found (i.e. write miss). In other embodiments, an optimized write policy that avoids adding latency to normal memory reads and writes may be used. Specifically, under the optimized write polity, the bitmap cache maintains the normal write back policy for a write hit but switches to an optimized write miss policy during a write miss. Under the optimized policy, the page index bitmap cache handles a write miss by simply finding an unallocated entry and setting the appropriate status bit to track the newly detected access. Initially, all entries of the page index bitmap cache are unallocated and their bits cleared. Then, as the system runs for some time, the number of unallocated entries goes down towards a threshold T (e.g. 10% of total entries). When the number of allocated entries reaches the threshold, the page index bitmap cache will begin opportunistically reclaiming entries in anticipation of future use. Being opportunistic here means the page index bitmap cache will initiate writing back entries to memory only when memory bandwidth usage is not high. In extreme situations where all entries are allocated, however, the bitmap cache will reclaim entries regardless of the memory bandwidth usage.

According to embodiments, reclaiming an allocated cache entry includes two memory requests. A first memory request reads data from a location in the reserved page index bitmap in memory and stored the read data as data 240 in the page index bitmap cache or a data register. The location in the page index bitmap from which the data is read is determined based on the base memory address of the reserved page index bitmap plus the tag of the cache entry. Thereafter, a second memory request writes new data back into the same location in the reserved page index bitmap. The new data includes a result of a bitwise OR operation between the status bits in the cache entry and the data 240.

According to an embodiment, the cache line to be reclaimed may be selected at random or based on an LRU (Least Recent Used) policy, similar to that of a normal cache. Whether the memory bandwidth usage is high may be determined by comparing the memory bandwidth usage with an experiential threshold. Alternatively, or in addition to, the memory bandwidth usage may be determined based on whether a memory read or write occurs within an "Exponential Back-off" time window. Since the reclaiming operation can be scheduled at any time and there is no memory writeback on a write miss if an unallocated cache line available, the page index bitmap cache can generally avoid competing with normal memory read/write requests issued by other processor cores in the system.

FIG. 7 is a table comparing the memory accesses during a write miss between a normal cache and a page index bitmap cache according to an embodiment. As illustrated, in the event of a write miss, the number of memory accesses performed by a normal cache is 2 while no memory accesses are made by the page index bitmap cache, so long as there are unallocated entries available.

Figure 5:
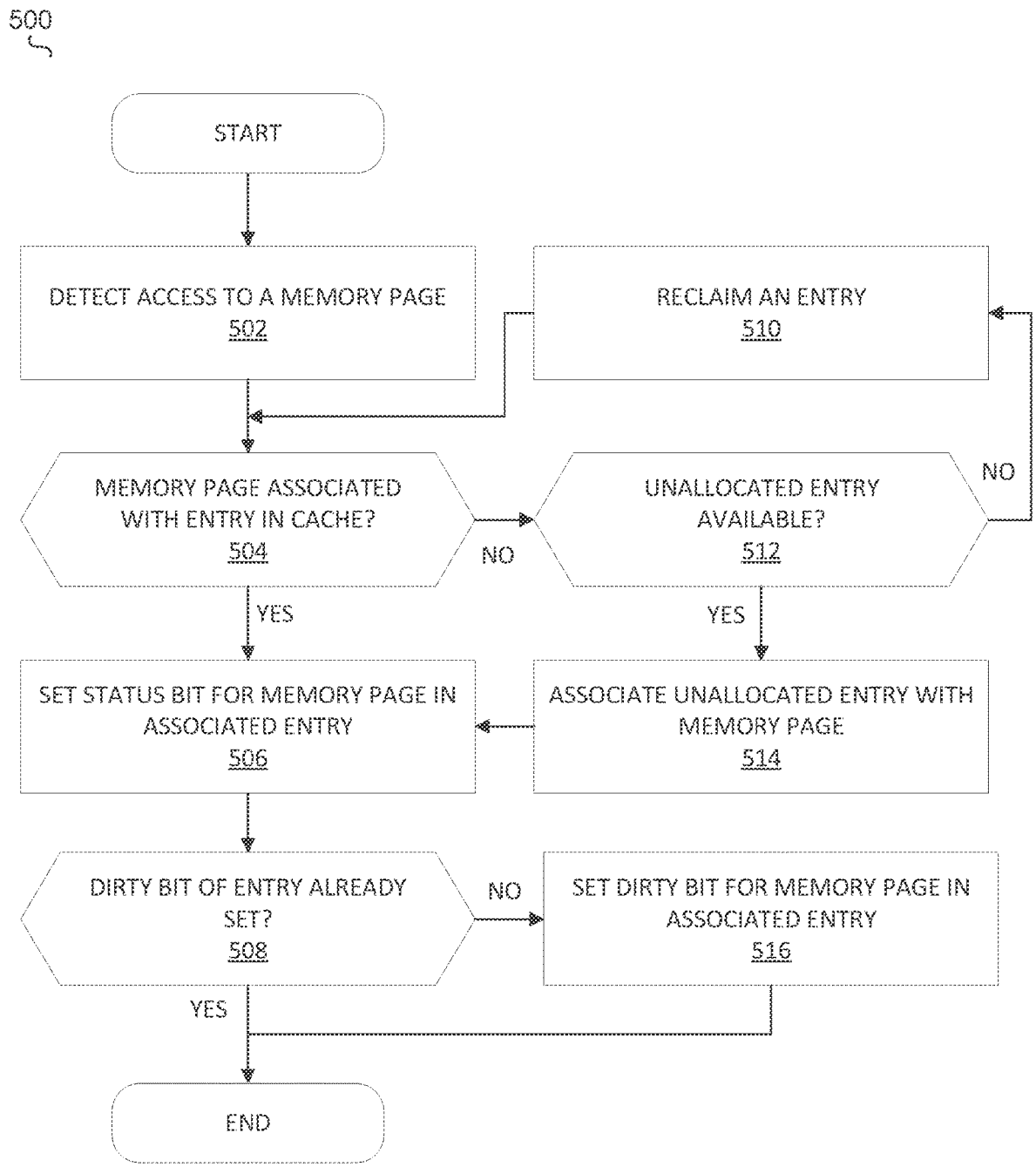
FIG. 5 is a block diagram illustrating the logic and operations of the page index bitmap cache according to an embodiment.

FIG. 5 is a flow diagram illustrating the logic and operations of the page index bitmap cache according to an embodiment. Method 500 may be implemented by the page index bitmap cache and/or a corresponding cache controller. Method 500 begins at the start block and proceeds to block 502, where a request to access a memory page is detected. The page index bitmap cache may monitor the connections, such as a mesh interconnect, for any memory requests that seek to access memory pages stored in memory. At block 504, a determination is made on whether the requested page is already associated with an entry in the page index bitmap cache based on the memory address of the requested page. The determination may be include scanning the entries of the page index bitmap cache to find an entry with a tag matching the tag in the memory address of the requested page. If a matching entry is found in the page index bitmap cache (i.e. a write hit), then at block 506, the status bit in the matching entry that corresponds to the requested page is set. As described above in relation to FIGS. 3A and 3B, the status bit corresponding to the requested page may be determined based on a portion (i.e. Y-bits) of the memory address. Next, at block 508, the dirty bit of the matching entry is checked to see if it is already set. If so, the method ends. Otherwise, the dirty bit of the matching entry is set at block 516 to indicate that the matching entry was modified.

Referring back to block 504, if no entry in the page index bitmap cache is found to be associated with the requested page (i.e. a write miss), then at block 512, a determination is made on whether an unallocated entry is available for tracking the requested page. At block 514, if an unallocated entry is available, then the unallocated entry is set to be associated with requested page. This may include clearing the dirty bit of the unallocated entry, setting the tag of the unallocated entry to the tag in the memory address of requested page, and setting the status bit that corresponds to the requested page in the unallocated entry. If, however, no unallocated block is available, then at block 510, an entry is reclaimed so that it can be used to track the requested page. The reclamation may include evicting or flushing one or more entries in the page index bitmap cache, thereby causing a write back of their respective status bits into the reserved page index bitmap.

Figure 6:
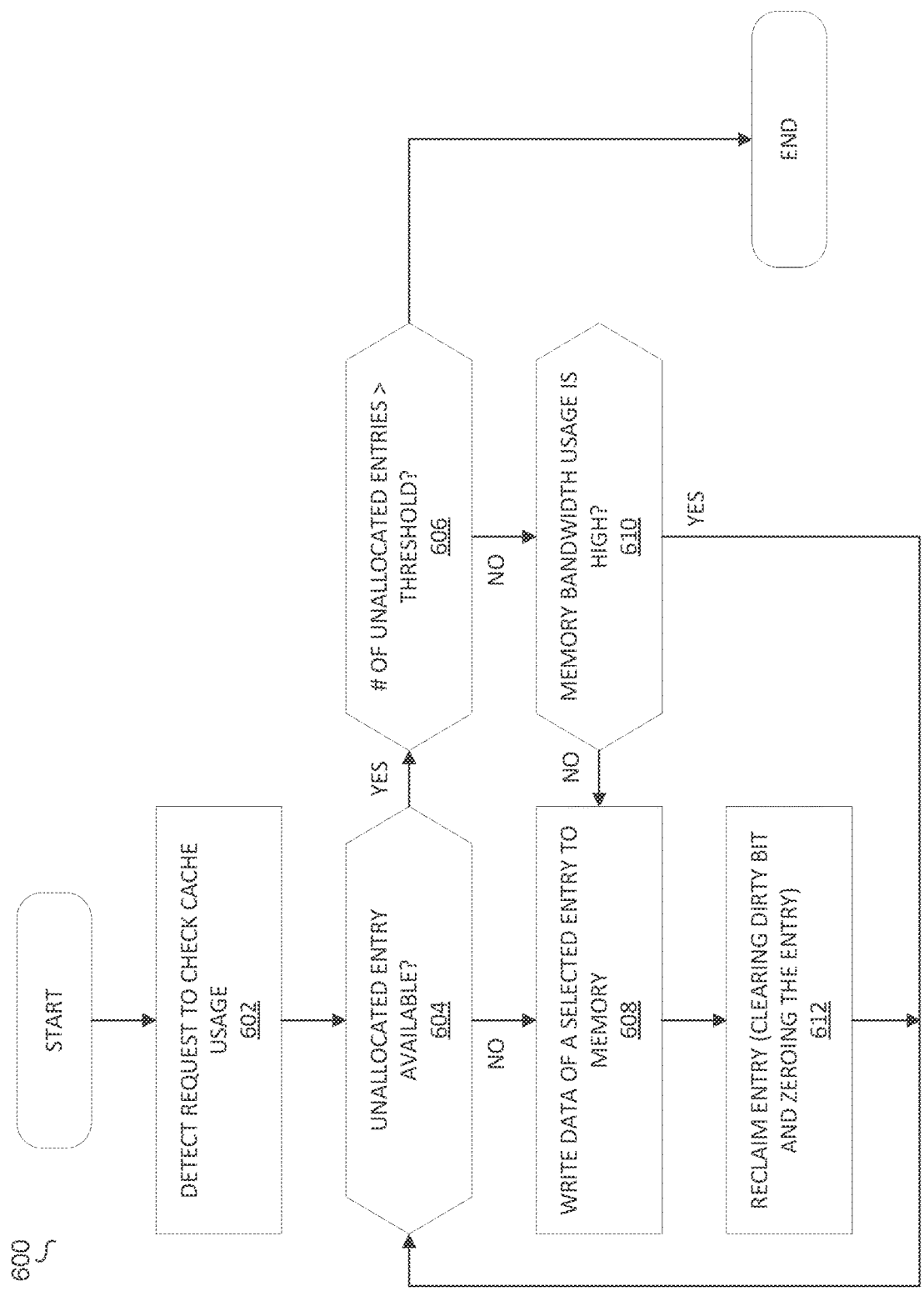
FIG. 6 is a flow diagram illustrating the logic and operations to reclaim an entry in the page index bitmap cache in accordance to an embodiment.

FIG. 6 is a flow diagram illustrating the logic and operations to reclaim an entry in the page index bitmap cache in accordance to an embodiment. Method 600 may be implemented by the page index bitmap cache and/or its controller, as well as by other suitable hardware and/or software systems. Method 600 begins at the start block and proceeds to block 602, in which a request to check cache usage is detected. This may include detecting a request to allocate a new entry or to reclaim one or more existing entries in the page index bitmap cache. At block 604, a determination is made on whether any unallocated entries are available. If no unallocated entries are available, then one or more entries are selected for eviction. Any suitable eviction rule, such as least recently used (LRU), may be used to select the eviction candidates. At block 608, the data in the entry selected as the eviction candidate is written back or stored into the memory. The writeback may include first retrieving existing data (e.g., status bits) from the reserved page index bitmap in memory and performing a logical OR operation between the data in the entry selected for eviction and the data retrieved from the reserved page index bitmap. Next, at block 612, after the data in the entry selected for eviction has been stored into the reserved page index bitmap, the selected entry is reclaimed. The reclamation may include clearing and/or zeroing the dirty bit, the tag, and/or the status bits of the now evicted entry. According to an embodiment, the target memory address for storing the evicted entry is the base memory address of the reserved page index bitmap, which is as part of configuration settings (e.g., 220), plus the tag of the evicted entry (e.g., bits [63:18] of entry 330). As for the target memory controller or channel to which the evicted cache line is sent, it is determined based on the interleave rules (e.g., 230).

Referring back to block 604, if one or more unallocated entries are available in the page index bitmap cache, then at block 606, the number of unallocated entries is compared with a predetermined threshold. The threshold may be set during boot up or initialization of the system. Moreover, the threshold may be set by OS or application through the BIOS and saved as a configuration setting. According to an embodiment, if the number of unallocated entries is greater than the predetermined threshold, the method ends. On the other hand, if the number of unallocated entries is less than the predetermined threshold, an indication that the bitmap cache may be nearing its capacity, then at block 610, a determination is made on whether the current memory bandwidth usage is high. This may be determined based on comparing the current memory bandwidth usage with a predetermined bandwidth usage threshold. Again, this threshold may be set by the OS and/or applications via BIOS and is saved as part of the configuration settings. If the determination in block 610 is affirmative, then any additional usage of the memory bandwidth may adversely impact the overall performance of the system. As such, the page index bitmap cache holds off on writing any cached data into reserved page index bitmap and the method returns to block 604. If, however, the memory bandwidth usage is not high, an indication of the availability of spare memory bandwidth, then method 600 continues to block 608 where one or more entries are selected for eviction. This includes writing the data cached in the selected entries into the reserved page index bitmap. As described above, data in the selected entries may be merged with existing data in the page index bitmap through, for instance, a logical OR operation.

An example of usage flow according to an embodiment is as follows:
1) User enables the page index bitmap cache via BIOS setup menu.
2) OS gets the base address and size of the per socket reserved bitmap memory (e.g. from an advanced configuration and power interface (ACPI) table).
3) OS clears the per socket reserved bitmap memory.
4) Wait for a duration (e.g. 10 seconds).
5) OS flushes and clears the bitmap cache.
6) OS reads the per socket reserved bitmap memory for cold pages indices.
7) The code pages indices are used in various cases.
   a. OS migrates some of the cold pages from memory (e.g., DDR4) to secondary storage (HDD/SSD) to make room for more workloads.
   b. Online estimate workload's Working Set Size.
8) Back to step 3.

According to an embodiment, in a system with non-uniform memory access (NUMA) characteristics, the whole system address space is split into: [0, A1) in the 1st socket, [A1, A2) in the 2nd socket . . . [An−1, An) in the n-th socket. As a result, the page index indicated by the x-th bit in the n-th socket bitmap is: x+the bits {63:12} of An−1, where A0=0. In system with uniform memory access characteristics, the interleave rules are used for figuring out which bits of the per socket bitmap are to be combined to get the cold pages indices.

An example of the present invention is an apparatus that includes one or more processor cores to access the memory pages stored in a memory by issuing access requests, and a page index bitmap to track accesses made by the one or more processor cores to the memory pages stored in the memory. The page index bitmap may store the tracked accesses. The tracked accesses may be usable for identifying infrequently-accessed memory pages. The identified infrequently-accessed memory pages may be removed from the memory and stored into a secondary storage. The apparatus may further include a page index bitmap cache to track recent accesses made by the processor cores to the memory pages. The tracked recent accesses may subsequently be stored into the page index bitmap. To avoid taking up memory bandwidth, the tracked recent accesses may be stored into the page index bitmap only when the memory bandwidth usage of the memory is lower than a bandwidth usage threshold, or when the page index bitmap cache needs to reclaim entries to track new accesses (e.g., when there are no more unallocated entries available). The page index bitmap cache may include a plurality of entries. Each of the entries may include a plurality of status bits each of which corresponds to a different memory page and is to indicate whether the corresponding memory page has been accessed recently by the processor cores. Each of the entries may further include a dirty bit to indicate whether any of its status bits have been modified. The apparatus may also include storage to store configuration settings for configuring the page index bitmap cache. The configuration settings may be configured through BIOS (e.g., by a user). The page index bitmap may be stored in the memory. In cases where the memory includes multiple memory modules, the page index bitmap may be distributed among the multiple memory modules, such that each of the memory modules may store portion of the page index bitmap. The apparatus may also include storage to store one or more interleave rules, which are used for determining one or more of the memory modules to which the tracked recent accesses should be sent so that they can be stored in the appropriate portion of the page index bitmap. The apparatus may further include storage for storing prior accesses retrieved from the page index bitmap. The tracked recent accesses may be stored into the page index bitmap by first retrieving prior accesses from the page index bitmap, then performing a bit-wise OR operation between the tracked recent accesses and the prior accesses to generate a merged result, and finally storing the merged result back into the page index bitmap.

Another example of the present invention includes a method to identify and track cold memory pages. The method may include storing memory pages in a memory; monitoring accesses requests issued by one or more processor cores to access the memory pages stored in the memory; tracking, via a page index bitmap, accesses made by the one or more processor cores to the memory pages stored in the memory; storing the tracked accesses in the page index bitmap, identifying infrequently-accessed memory pages based on the tracked accesses stored in the page index bitmap; removing the infrequently-accessed memory pages from the memory; and storing the infrequently-accessed memory pages into a secondary storage. A location in the memory may be reserved for storing the page index bitmap. In some cases, the method may further include tracking recent accesses made by the processor cores to the memory pages stored in the memory by using a page index bitmap cache, and subsequently storing the tracked recent accesses into the page index bitmap. To avoid taking up memory bandwidth, the tracked recent accesses may be stored into the page index bitmap only when the memory bandwidth usage of the memory is lower than a bandwidth usage threshold, or when the page index bitmap cache needs to reclaim entries to track new accesses (e.g., when there are no more unallocated entries available). The page index bitmap cache may include a plurality of entries. Each of the entries may include a plurality of status bits each of which corresponds to a different memory page and is to indicate whether the corresponding memory page has been accessed recently by the processor cores. Each of the entries may further include a dirty bit to indicate whether any of its status bits have been modified. The method may also include storing in the memory or other storage locations, such as registers, the configuration settings for configuring the page index bitmap cache. The configuration settings may be configured through the BIOS (e.g., by a user). In cases where the memory includes multiple memory modules such that the page index bitmap is distributed among the different memory modules, the method may further include storing one or more interleave rules in the memory or other storage locations; selecting, based on the interleave rules, a memory module out of the multiple memory modules that make up the memory, and storing the tracked recent accesses in the page index bitmap of the selected memory module. To store the tracked recent accesses into the page index bitmap, the method may further include retrieving prior accesses from the page index bitmap, performing a bit-wise OR operation between the tracked recent accesses and prior accesses to generate a merged result; and storing the merged result in the page index bitmap.

Yet another example of the present invention is a system that includes a memory to store memory pages; one or more processor cores to access the memory pages stored in the memory by issuing access requests to the memory; a page index bitmap cache to track recent accesses made by the one or more processor cores to the memory pages; and a page index bitmap to maintain a list of all accesses made by the one or more processor cores to the memory pages in a given time frame. The page index bitmap may receive from the page index bitmap cache, updates to the list of all accesses based on the tracked recent accesses. The list of all accesses may be usable to identify infrequently accessed memory pages. The system may further include a secondary storage unit to store any infrequently accessed memory pages that are identified and removed from memory. To avoid taking up memory bandwidth, the tracked recent accesses may be stored into the page index bitmap only when the memory bandwidth usage of the memory is lower than a bandwidth usage threshold, or when the page index bitmap cache needs to reclaim entries to track new accesses (e.g., when there are no more unallocated entries available). The page index bitmap cache may include a plurality of entries. Each of the entries may include a plurality of status bits each of which corresponds to a different memory page and is to indicate whether the corresponding memory page has been accessed recently by the processor cores. Each of the entries may further include a dirty bit to indicate whether any of its status bits have been modified. The system may also include storage to store configuration settings for configuring the page index bitmap cache. The configuration settings may be configured by the users through BIOS. The page index bitmap may be stored in the memory. In cases where the memory includes multiple memory modules, the page index bitmap may be distributed among the multiple memory modules, such that each of the memory modules may store portion of the page index bitmap. The system may include storage to store one or more interleave rules, which are used for determining one or more of the memory modules to which the tracked recent accesses should be sent so that they can be stored in the appropriate portion of the page index bitmap. The system may further include storage for storing prior accesses retrieved from the page index bitmap. The tracked recent accesses may be stored into the page index bitmap by first retrieving prior accesses from the page index bitmap, then performing a bit-wise OR operation between the tracked recent accesses and the prior accesses to generate a merged result, and finally storing the merged result back into the page index bitmap.

Figure 8A:
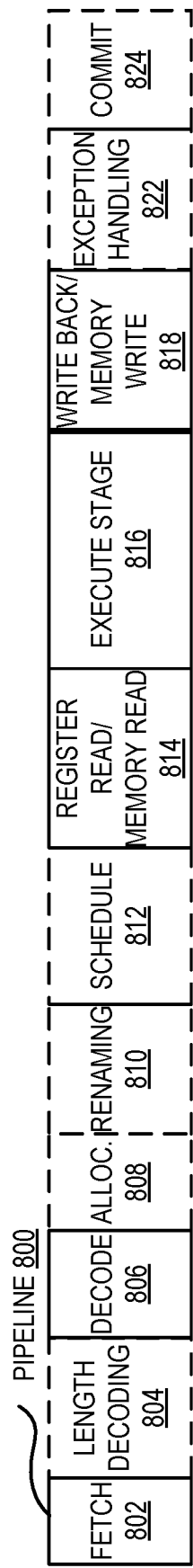
FIG. 8A is a block diagram illustrating both an exemplary in-order pipeline and an exemplary register renaming, out-of-order issue/execution pipeline according to embodiments of the invention.
Figure 8B:
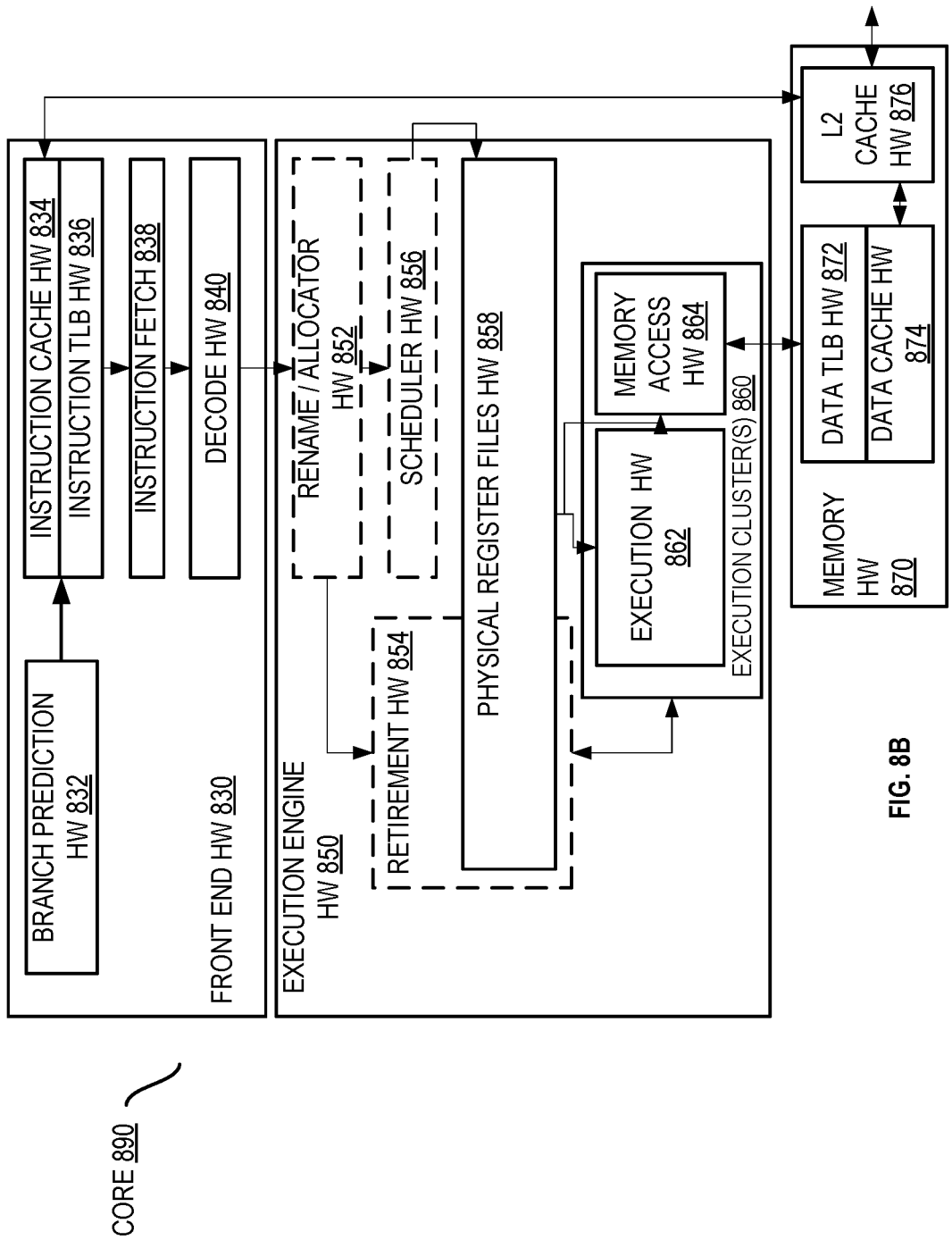
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end hardware 830 coupled to an execution engine hardware 850, and both are coupled to a memory hardware 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end hardware 830 includes a branch prediction hardware 832 coupled to an instruction cache hardware 834, which is coupled to an instruction translation lookaside buffer (TLB) 836, which is coupled to an instruction fetch hardware 838, which is coupled to a decode hardware 840. The decode hardware 840 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode hardware 840 or otherwise within the front end hardware 830). The decode hardware 840 is coupled to a rename/allocator hardware 852 in the execution engine hardware 850.

The execution engine hardware 850 includes the rename/allocator hardware 852 coupled to a retirement hardware 854 and a set of one or more scheduler hardware 856. The scheduler hardware 856 represents any number of different schedulers, including reservations stations, central instruction window, etc. The scheduler hardware 856 is coupled to the physical register file(s) hardware 858. Each of the physical register file(s) hardware 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 858 comprises a vector registers hardware, a write mask registers hardware, and a scalar registers hardware. This register hardware may provide architectural vector registers, vector mask registers, and general purpose registers. The physical register file(s) hardware 858 is overlapped by the retirement hardware 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 854 and the physical register file(s) hardware 858 are coupled to the execution cluster(s) 860. The execution cluster(s) 860 includes a set of one or more execution hardware 862 and a set of one or more memory access hardware 864. The execution hardware 862 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 856, physical register file(s) hardware 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 864). It should also be understood that where separate pipelines are used, one or more of these pipelines may be out-of-order issue/execution and the rest in-order.

The set of memory access hardware 864 is coupled to the memory hardware 870, which includes a data TLB hardware 872 coupled to a data cache hardware 874 coupled to a level 2 (L2) cache hardware 876. In one exemplary embodiment, the memory access hardware 864 may include a load hardware, a store address hardware, and a store data hardware, each of which is coupled to the data TLB hardware 872 in the memory hardware 870. The instruction cache hardware 834 is further coupled to a level 2 (L2) cache hardware 876 in the memory hardware 870. The L2 cache hardware 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode hardware 840 performs the decode stage 806; 3) the rename/allocator hardware 852 performs the allocation stage 808 and renaming stage 810; 4) the scheduler hardware 856 performs the schedule stage 812; 5) the physical register file(s) hardware 858 and the memory hardware 870 perform the register read/memory read stage 814; the execution cluster 860 perform the execute stage 816; 6) the memory hardware 870 and the physical register file(s) hardware 858 perform the write back/memory write stage 818; 7) various hardware may be involved in the exception handling stage 822; and 8) the retirement hardware 854 and the physical register file(s) hardware 858 perform the commit stage 824.

The core 890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 890 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 834/874 and a shared L2 cache hardware 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
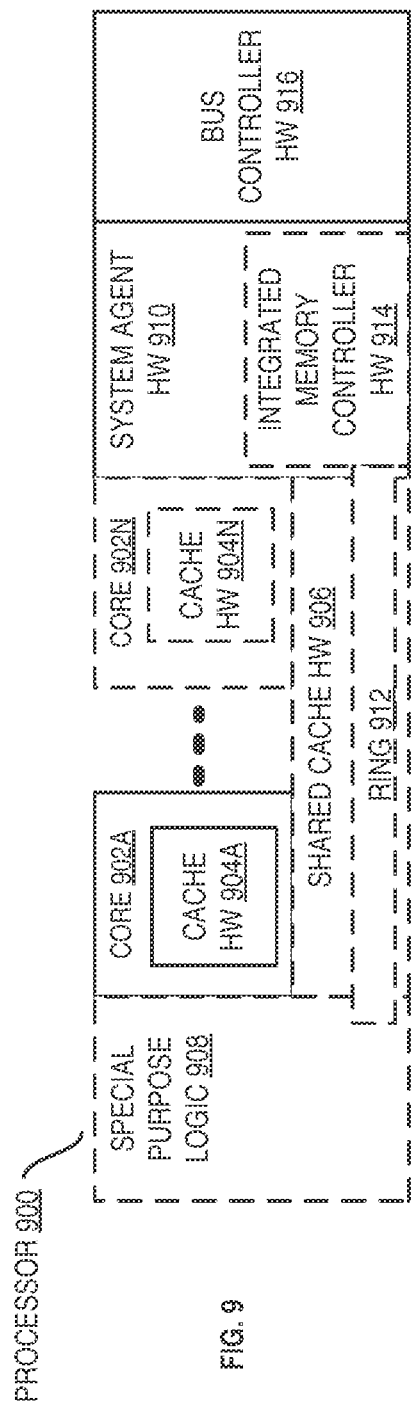
FIG. 9 is a block diagram of a single core processor and a multicore processor with integrated memory controller and graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller hardware 916, while the optional addition of the dashed lined boxes illustrates an alternative processor 900 with multiple cores 902A-N, a set of one or more integrated memory controller hardware 914 in the system agent hardware 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 906, and external memory (not shown) coupled to the set of integrated memory controller hardware 914. The set of shared cache hardware 906 may include one or more mid-level caches, such as level 2 (L2), level 3 (L3), level 4 (L4), or other levels of cache, a last level cache (LLC), and/or combinations thereof. While in one embodiment a ring based interconnect hardware 912 interconnects the integrated graphics logic 908, the set of shared cache hardware 906, and the system agent hardware 910/integrated memory controller hardware 914, alternative embodiments may use any number of well-known techniques for interconnecting such hardware. In one embodiment, coherency is maintained between one or more cache hardware 906 and cores 902-A-N.

In some embodiments, one or more of the cores 902A-N are capable of multi-threading. The system agent 910 includes those components coordinating and operating cores 902A-N. The system agent hardware 910 may include for example a power control unit (PCU) and a display hardware. The PCU may be or include logic and components needed for regulating the power state of the cores 902A-N and the integrated graphics logic 908. The display hardware is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set. In one embodiment, the cores 902A-N are heterogeneous and include both the "small" cores and "big" cores described below.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
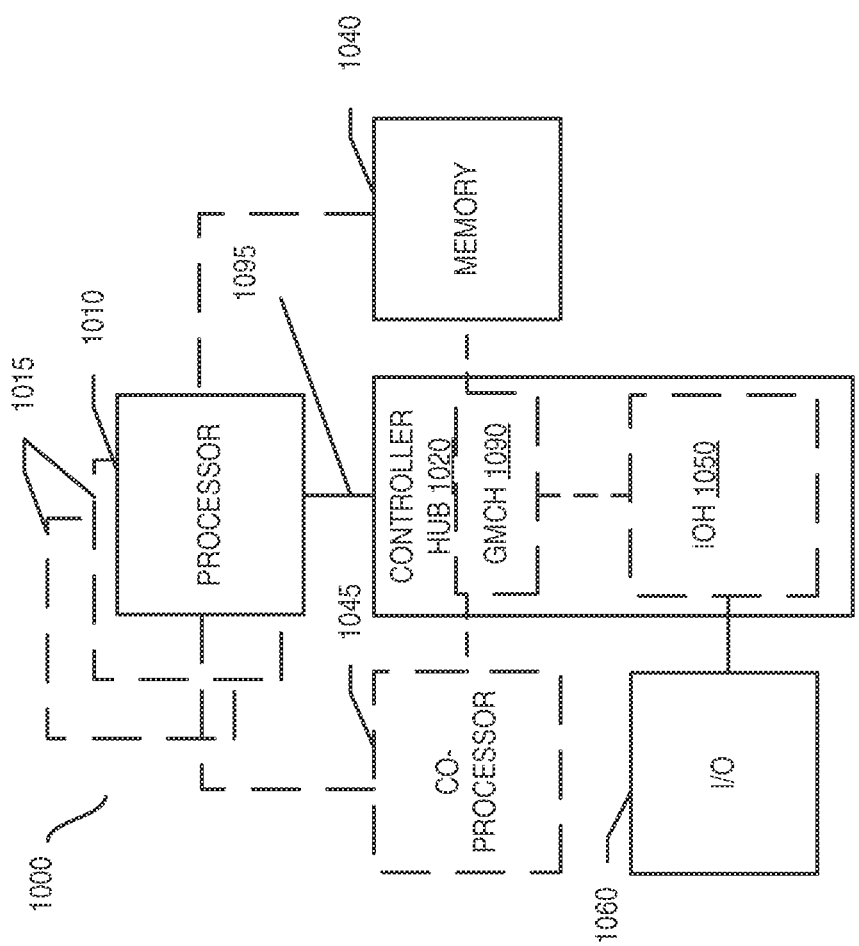
FIG. 10 illustrates a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface, or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
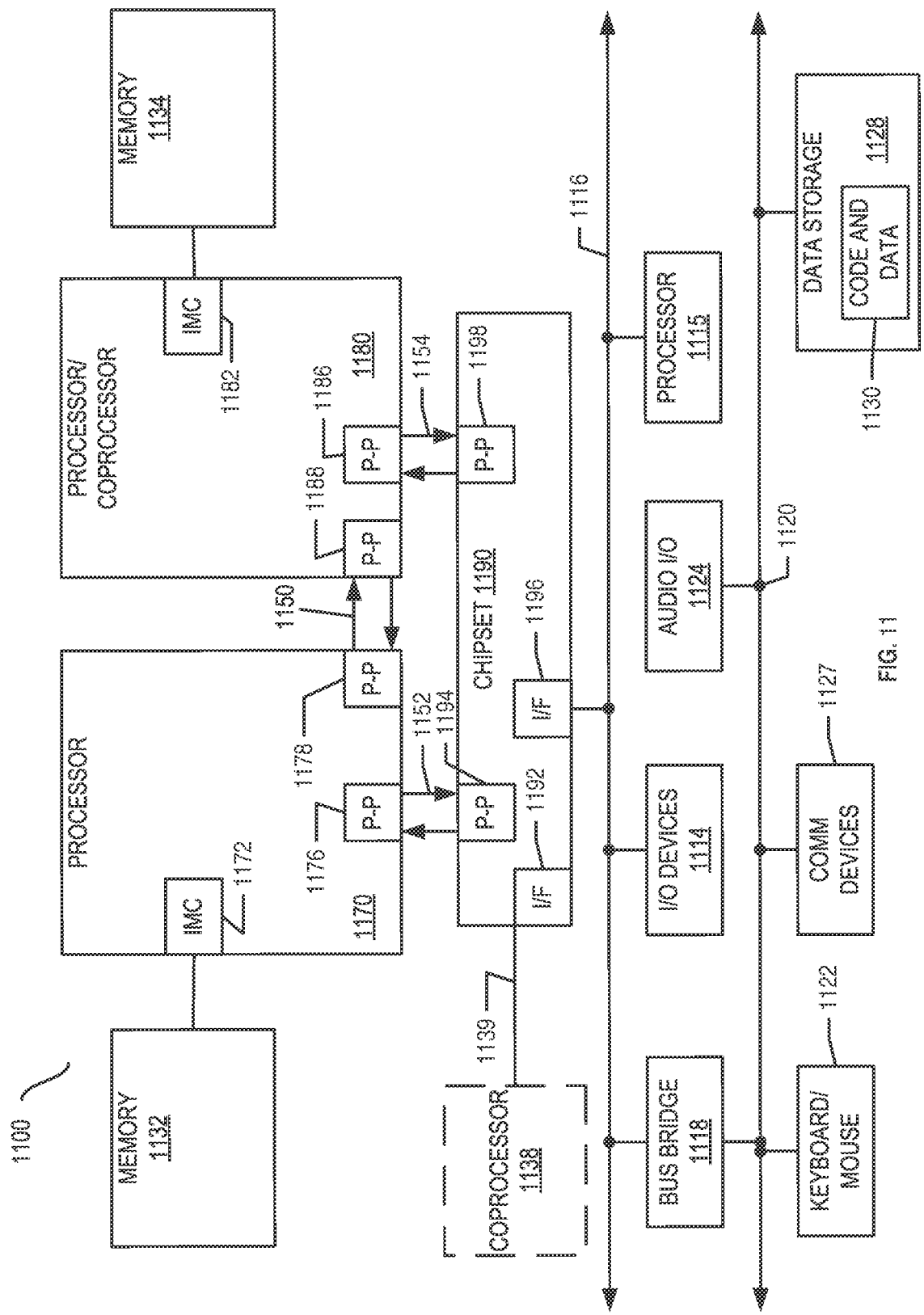
FIG. 11 illustrates a block diagram of a second system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) hardware 1172 and 1182, respectively. Processor 1170 also includes as part of its bus controller hardware point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) hardware), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage hardware 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
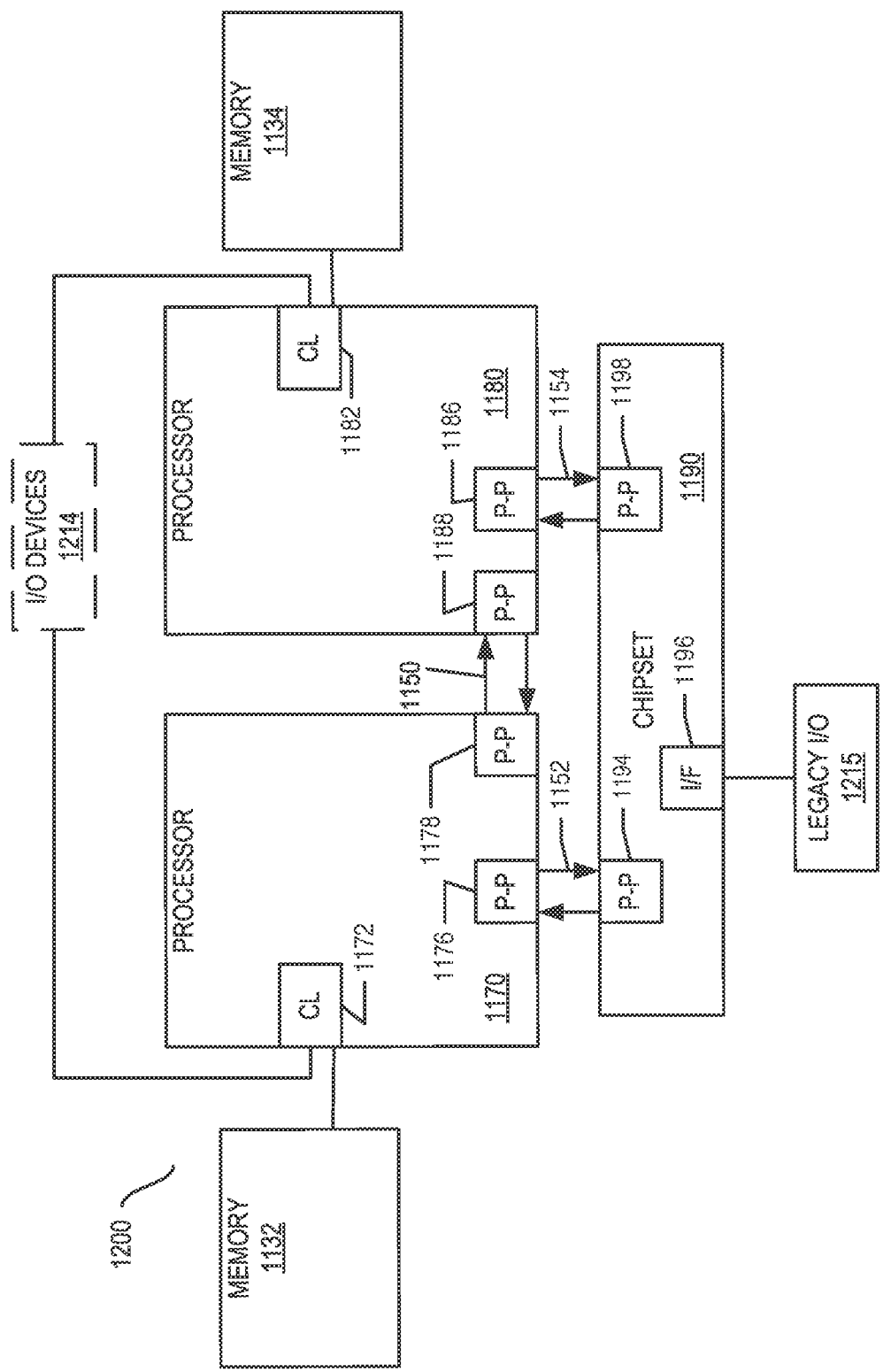
FIG. 12 illustrates a block diagram of a third system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller hardware and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
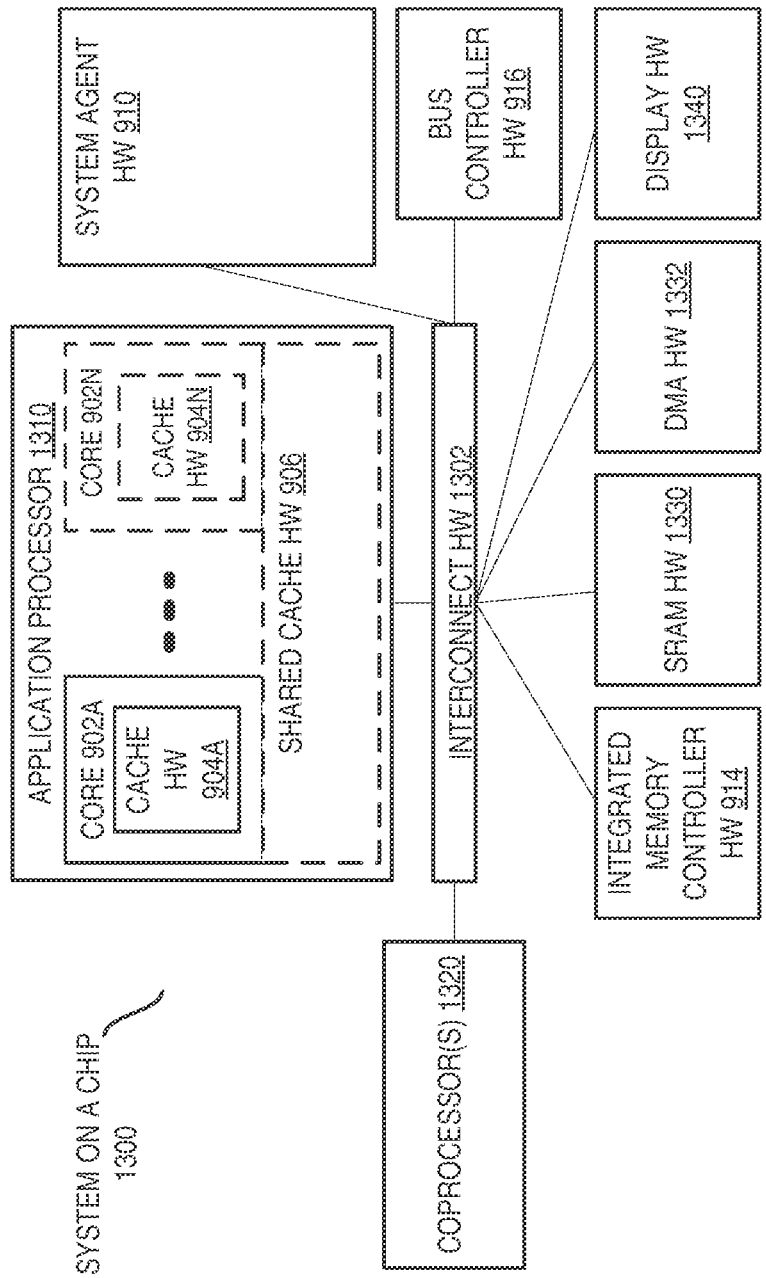
FIG. 13 illustrates a block diagram of a system on a chip (SoC) in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect hardware 1302 is coupled to: an application processor 1310 which includes a set of one or more cores 902A-N and shared cache hardware 906; a system agent hardware 910; a bus controller hardware 916; an integrated memory controller hardware 914; a set or one or more coprocessors 1320 which may include integrated graphics logic, an image processor, an audio processor, and a video processor; an static random access memory (SRAM) hardware 1330; a direct memory access (DMA) hardware 1332; and a display hardware 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
    one or more processor cores to access memory pages stored in a memory by issuing access requests to the memory; and
    a cache to track recent accesses made by the one or more processor cores to the memory pages, wherein responsive to one or more criteria being met, the tracked recent accesses are to be subsequently stored into a page index bitmap to track accesses made by the one or more processor cores to the memory pages and to store the tracked accesses, the tracked accesses usable to identify infrequently-accessed memory pages, wherein the infrequently-accessed memory pages are to be removed from the memory and stored in a secondary storage;
    wherein the memory comprises a plurality of memory modules, each of the plurality of memory modules storing a portion of the page index bitmap, and wherein the apparatus further comprises storage to store one or more interleave rules, the one or more interleave rules usable for determining which of the plurality of memory modules stores the portion of the page index bitmap that is to store the tracked recent accesses.

2. The apparatus of claim 1, wherein the page index bitmap is stored in the memory.

3. The apparatus of claim 1, wherein the one or more criteria are met when a memory bandwidth usage of the memory is lower than a bandwidth usage threshold.

4. The apparatus of claim 1, wherein the one or more criteria are met when the cache needs to reclaim entries to track new accesses.

5. The apparatus of claim 1, wherein the cache comprises a plurality of entries, each of the entries comprising a plurality of status bits, each of the plurality of status bits corresponding to a different memory page and is to indicate whether the corresponding memory page has been recently accessed by the one or more processor cores.

6. The apparatus of claim 5, wherein each of the plurality of entries further comprises a dirty bit to indicate whether any of the plurality of status bits in the entry have been modified.

7. The apparatus of claim 1, wherein further comprising storage to store configuration settings for configuring the cache, wherein the configuration settings are configured through a basic input/output system (BIOS) of the apparatus.

8. The apparatus of claim 1, further comprising storage to store prior accesses retrieved from the page index bitmap.

9. The apparatus of claim 1, wherein the tracked recent accesses are subsequently stored into the page index bitmap by:
    retrieving prior accesses from the page index bitmap;
    performing a bit-wise OR operation between the tracked recent accesses and prior accesses to generate a merged result; and
    storing the merged result in the page index bitmap.

10. A method comprising:
    storing memory pages in a memory;
    monitoring accesses requests issued by one or more processor cores to access the memory pages stored in the memory;
    tracking, via a cache, recent accesses made by the one or more processor cores to the memory pages stored in the memory;
    responsive to one or more criteria being met, storing the recent tracked accesses in a page index bitmap;
    identifying infrequently-accessed memory pages based on accesses tracked by the page index bitmap,
    removing the infrequently-accessed memory pages from the memory;
    storing the infrequently-accessed memory pages in a secondary storage;
    storing one or more interleave rules;

selecting, based on the one or more interleave rules, a first memory module out of a plurality of memory modules which make up the memory, each of the plurality of memory modules storing a portion of the page index bitmap; and storing the tracked recent accesses in the portion of the page index bitmap that is stored in the first memory module.

11. The method of claim 10, further comprising reserving a location in the memory for storing the page index bitmap.

12. The method of claim 10, wherein the one or more criteria are met when a memory bandwidth usage of the memory is lower than a bandwidth usage threshold.

13. The method of claim 10, wherein the one or more criteria are met when the cache needs to reclaim entries to track new accesses.

14. The method of claim 10, wherein the cache comprises a plurality of entries, each of the entries comprising a plurality of status bits, each of the plurality of status bits corresponding to a different memory page and is to indicate whether the corresponding memory page has been recently accessed by the one or more processor cores.

15. The method of claim 14, wherein each of the plurality of entries further comprises a dirty bit to indicate whether any of the plurality of status bits in the entry have been modified.

16. The method of claim 10, further comprising storing configuration settings for configuring the cache, the configuration settings configured through a basic input/output system (BIOS).

17. The method of claim 10, further comprising:
retrieving prior accesses from the page index bitmap;
performing a bit-wise OR operation between the tracked recent accesses and prior accesses to generate a merged result; and
storing the merged result in the page index bitmap.

18. A system comprising:

a memory to store memory pages;

one or more processor to access the memory pages stored in the memory by issuing access requests to the memory;

a cache to track recent accesses made by the one or more processors to the memory pages, wherein a page index bitmap is to maintain a list of all accesses made by the one or more processors to the memory pages in a given time frame, the page index bitmap to receive from cache updates, responsive to one or more criteria being met, based on the tracked recent accesses, wherein the list of all accesses is usable to identify infrequently accessed memory pages;

a secondary storage unit to store the infrequently accessed memory pages removed from the memory;

wherein the memory comprises a plurality of memory modules, each of the plurality of memory modules storing a portion of the page index bitmap, and wherein the apparatus further comprises storage to store one or more interleave rules, the one or more interleave rules usable for determining which of the plurality of memory modules stores the portion of the page index bitmap that is to store the tracked recent accesses.

19. The system of claim 18, wherein the page index bitmap is stored in the memory.

20. The system of claim 19, wherein the one or more criteria is met when a memory bandwidth usage of the memory is lower than a bandwidth usage threshold.

21. The system of claim 19, wherein the one or more criteria is met when the cache needs to reclaim entries to track new accesses.

* * * * *